United States Patent [19]

Minh

[11] Patent Number: 5,788,788
[45] Date of Patent: Aug. 4, 1998

[54] PREPARATION OF A SOLID OXIDE FUEL CELL HAVING THIN ELECTROLYTE AND INTERCONNECT LAYERS

[75] Inventor: Nguyen Q. Minh, Fountain Valley, Calif.

[73] Assignee: AlliedSignal Inc., Morris Township, N.J.

[21] Appl. No.: 662,724

[22] Filed: Jun. 10, 1996

Related U.S. Application Data

[60] Division of Ser. No. 301,930, Sep. 7, 1994, Pat. No. 5,589,017, which is a continuation-in-part of Ser. No. 11,052, Jan. 29, 1993, Pat. No. 5,368,667.

[51] Int. Cl.$^6$ ............................................. C04B 37/00
[52] U.S. Cl. ........................... 156/62.2; 156/87; 156/89
[58] Field of Search .......................... 156/89, 62.2, 87; 264/614

[56] References Cited

U.S. PATENT DOCUMENTS

| | | | |
|---|---|---|---|
| 2,371,353 | 3/1945 | Parsons | 25/156 |
| 2,966,719 | 1/1961 | Park, Jr. | 25/156 |
| 3,991,149 | 11/1976 | Hurwitt | 264/63 |
| 4,752,857 | 6/1988 | Khoury et al. | 361/321 |
| 4,816,036 | 3/1989 | Kotchick | 29/623.3 |
| 4,913,982 | 4/1990 | Kotchick et al. | 429/12 |
| 5,053,294 | 10/1991 | Sernka et al. | 429/104 |
| 5,368,667 | 11/1994 | Minh | 156/89 |

*Primary Examiner*—Christopher A. Fiorilla
*Attorney, Agent, or Firm*—John R. Rafter

[57] ABSTRACT

A method of preparing a fuel cell element includes the steps of: laminating ceramic tapes to form an unfired anode/electrolyte laminate; reducing the thickness of the anode/electrolyte laminate; sintering the anode/electrolyte laminate; laminating ceramic tapes to form an unfired cathode/interconnect laminate; reducing the thickness of the cathode/interconnect laminate; embossing a gas flow path pattern into the cathode layer of the cathode/interconnect laminate; sintering the cathode/interconnect laminate; and bonding the sintered anode/electrolyte laminate to the sintered cathode/interconnect laminate such that the electrolyte layer contacts the cathode layer. The fuel cell produced by this method has thin electrolyte and interconnect layers which result in high fuel cell outlet power.

6 Claims, 2 Drawing Sheets

PREPARATION OF A SOLID OXIDE FUEL CELL HAVING THIN ELECTROLYTE AND INTERCONNECT LAYERS

BACKGROUND OF THE INVENTION

This invention relates to fuel cells, and, more particularly, to solid oxide fuel cells having thin electrolyte and interconnect layers and, consequently, low internal electrical resistance.

This application is a division of U.S. patent application Ser. No. 08/301,930 filed Sep. 7, 1994, now U.S. Pat. No. 5,589,017 which is a continuation-in-part of application Ser. No. 08/011,052, filed Jan. 29, 1993, now U.S. Pat. No. 5,368,667 for which priority is claimed.

A fuel cell is a device in which a first reactant, a fuel such as hydrogen or a hydrocarbon, is electrochemically reacted with a second reactant, an oxidant such as air or oxygen, to produce a DC electrical output. A fuel cell includes an anode, or fuel electrode, which enhances the rate at which electrochemical reactions occur on the fuel side. There is also a cathode, or oxidant electrode, which functions similarly on the oxidant side. In the solid oxide fuel cell, a solid electrolyte, made of dense yttria-stabilized zirconia (YSZ) ceramic separates a porous ceramic anode from a porous ceramic cathode. The anode typically is made of nickelous oxide/YSZ cermet, and the cathode is typically made of doped lanthanum manganite.

In such a fuel cell, the fuel flowing to the anode reacts with oxide ions to produce electrons and water, which are removed in the fuel flow stream. The oxygen reacts with the electrons on the cathode surface to form oxide ions that diffuse through the electrolyte to the anode. The electrons flow from the anode through an external circuit and thence to the cathode. The electrolyte is a nonmetallic ceramic that is a nonconductor of electrons, ensuring that the electrons must pass through the external circuit to do useful work. However, the electrolyte permits the oxide ions to pass through from the cathode to the anode.

Each individual electrochemical cell, made of a single anode, a single electrolyte, and a single cathode, generates a relatively small voltage. To achieve higher voltages that are practically useful, the individual electrochemical cells are connected together in series to form a stack. The cells are connected in series electrically in the stack. The fuel cell stack includes an electrical interconnect between the cathode and the anode of adjacent cells. The fuel cell assembly also includes ducts or manifolding to conduct the fuel and oxidant into and out of the stack.

The fuel cell is desirably made inexpensively, but with excellent output performance. For most applications, it is also desired that the fuel cell have a high output power-to-weight ratio. There is an ongoing need for fuel cell designs and fabrication techniques that achieve these ends. The present invention provides such an approach, and further provides related advantages.

SUMMARY OF THE INVENTION

The present invention provides a solid oxide fuel cell and its method of preparation, wherein the electrolyte and interconnect structures are much thinner than possible with conventional approaches. The thinness of the electrolyte and interconnect reduces the internal electrical resistance of the fuel cell. Consequently, its output power is greater than possible with conventional fuel cells operating with the same fuel and oxidant, and at the same time its weight is less because of the reduced thicknesses. The fuel cell may also be operated at lower temperatures than conventional fuel cells, because the diffusion distances are smaller. The fuel cell components and fuel cells may be mass produced using the present approach.

In accordance with the invention, a method of preparing a fuel cell comprises the steps of preparing a first unfired ceramic tape comprising a first electrode material and preparing a second unfired ceramic tape comprising an electrolyte material. The second ceramic tape is thinner than the first ceramic tape, and is preferably less than about ⅕ the thickness of the first ceramic tape. The first ceramic tape and the second ceramic tape are laminated together to form an unfired first electrode/electrolyte laminate. The method further includes preparing a third unfired ceramic tape comprising a second electrode material and preparing a fourth unfired ceramic tape comprising an interconnect material. The fourth ceramic tape is thinner than the third ceramic tape, and is preferably less than about ⅕ the thickness of the first ceramic tape. The fourth ceramic tape and the third ceramic tape are laminated together to form an unfired second electrode/interconnect laminate.

The unfired first electrode/electrolyte laminate and the unfired second electrode/interconnect laminate are fabricated into a fuel cell. Fabrication typically involves reducing the thicknesses of the laminates, as by rolling, to reduce the thickness of the electrolyte and the interconnect layers to minimal values, typically on the order of 1–10 micrometers in each case, while the electrode layers are reduced in thickness to about 0.25 to about 1 millimeter. One of the thicker electrodes, preferably the anode, supports the very thin electrolyte. The other of the thicker electrodes, preferably the cathode, supports the very thin interconnect. The electrolyte and interconnect could not otherwise be readily fabricated into such thin layers.

The desired gas flow path patterns are formed into the surfaces of the unfired first and second electrode layers, preferably by embossing. The laminates are thereafter cut to shape as necessary, sintered, and assembled into a fuel cell element, or first assembled and then sintered. Multiple fuel cell elements may be stacked and bonded together to form a fuel cell, with the interconnects conducting current between the adjacent fuel cell elements.

This approach permits the fuel cell to be fabricated economically in mass production quantities. The fuel cell has reduced internal resistance and improved power-to-weight ratio because two of its four component layers—the electrolyte and the interconnect—are made much thinner than is possible with conventional techniques. By fabricating the laminates separately, it is possible to sinter them separately. This permits one laminate to be sintered at a higher temperature than the other. The sintering temperature for the interconnect is typically higher than for the electrolyte.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
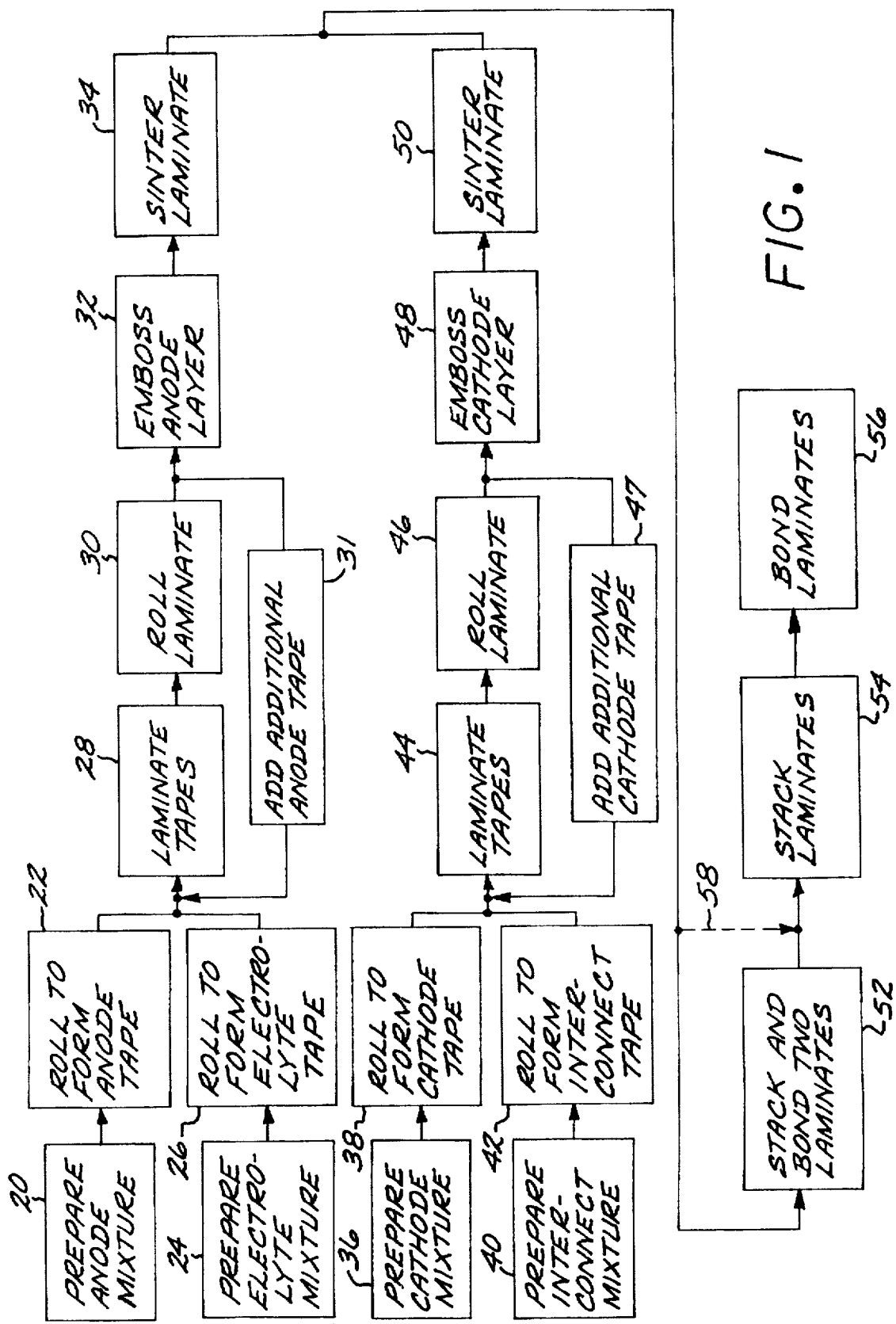
FIG. 1 is a block process flow diagram for a preferred approach of the invention.
Figure 2:
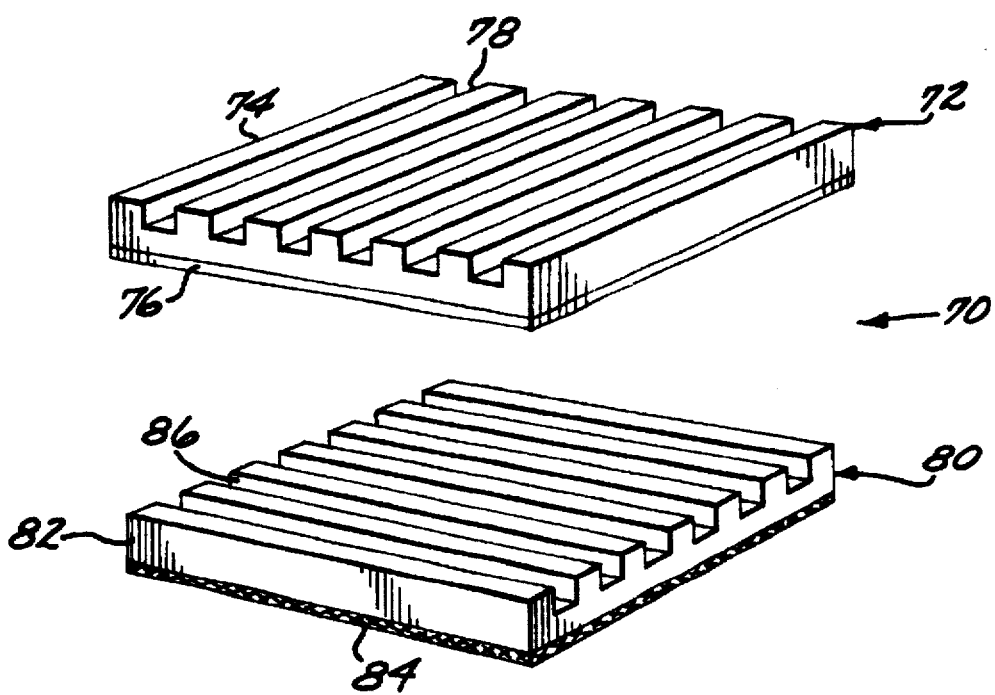
FIG. 2 is an exploded view of a fuel cell element according to the invention.

FIG. 1 depicts the preferred approach of the invention in block diagram form, and FIG. 2 shows an example of a solid oxide fuel cell made by this method.

A mixture containing the anode material is prepared, numeral 20. In a preferred embodiment, the anode material is a mixture of from about 25 to about 45 parts by volume of nickelous oxide and from about 75 to about 55 parts by volume of yttria-stabilized zirconia (YSZ) cermet. From about 60 to about 40 parts by volume of this anode material is mixed with about 20 to about 30 parts by volume of a known binder such as synthetic rubber, polyvinyl alcohol, or a thermoplastic resin, and about 20 to about 30 parts by volume of a known plasticizer such as a compound having glycol or phthalate groups. These constituents are mixed in a mixer and passed between a pair of rollers to form an unfired anode tape, numeral 22. In a preferred embodiment, the unfired anode tape is from about 0.030 inches to about 0.100 inches thick.

The electrolyte material is preferably yttria-stabilized zirconia (YSZ). A mixture of from about 60 to about 40 parts by volume of YSZ, from about 20 to about 30 parts by volume of the same binder as used for the anode, and from about 20 to about 30 parts by volume of the same plasticizer as used for the anode are mixed together in a mixer, numeral 24. The mixture is passed between a pair of rollers to form an unfired electrolyte tape, numeral 26. In a preferred embodiment, the unfired electrolyte tape is from about 0.005 inches to about 0.020 inches thick, a thickness which can be handled as long as reasonable care is taken.

The thickness of the unfired electrolyte tape is preferably about $\frac{1}{5}$ or less of the thickness of the anode tape, as is apparent from the above preferred values. The final thickness of the electrolyte is desirably very small (i.e., from about 1 to about 10 micrometers) in order to reduce internal resistance of the completed fuel cell. When the thickness of the unfired electrolyte layer is much less than that of the unfired anode layer, such as $\frac{1}{5}$ its thickness or less, the subsequently described processing approach will produce a thin (e.g., from about 1 to about 10 micrometers thickness) electrolyte on a thicker anode (e.g., from about 0.25 to about 1 millimeter). The anode provides support for the electrolyte structure before and after sintering.

One layer of the unfired tape comprising an anode material and one layer of the unfired tape comprising an electrolyte material are stacked one over the other. The stack is passed between two rollers to laminate the two layers together to form an unfired anode/electrolyte laminate, numeral 28. The lamination is readily performed due to the presence of the binder and plasticizer in each tape. There is little, if any, reduction in thickness required to accomplish the lamination.

The unfired anode/electrolyte laminate is passed between one or more pairs of rollers to reduce the thickness of the laminate, numeral 30. In order to achieve a very thin electrolyte layer in the laminate, an additional anode tape may be added in contact with the anode side of the laminate, numeral 31, and the steps 28 and 30 repeated. The steps of adding a further anode tape 31, laminating 28, and rolling 30 can be repeated multiple times to reach an ever thinner electrolyte layer. Desirably, this thinning is continued until the thickness of the unfired anode layer (usually made up of multiple anode tape layers laminated together as described) is from about 0.25 to about 1 millimeter and the thickness of the unfired electrolyte layer is from about 1 to about 10 micrometers. In such thicknesses, the electrolyte layer is not self supporting, and can be fabricated and handled only with a substrate support such as the anode layer.

The exposed surface of the final anode layer of the unfired anode/electrolyte laminate is embossed with an anode gas flow pattern of channels, numeral 32. In operation, the hydrocarbon or other fuel for the fuel cell is passed through this gas flow pattern of channels. In many conventional fuel cell fabrication approaches, the gas flow pattern must be provided by a pattern of spacers and the like that can add to the weight of the fuel cell. In the present approach, the pattern of channels is formed into the unfired anode layer using a male die to emboss the pattern. Any operable pattern for a selected fuel cell design can be embossed.

The unfired, but embossed, anode/electrolyte laminate is sintered at elevated temperature, numeral 34. In the preferred approach, the anode/electrolyte laminate is heated to a temperature of from about 200°–500° C. for a period of about 1–5 hours in a furnace to drive off the organic binder and plasticizer. The temperature is thereafter increased to about 1300°–1400° C. for about 1 hour to accomplish sintering of the powder mixture of the anode and the powder of the electrolyte. The sintering also sinters the two tapes firmly together to form a single, fired anode/electrolyte laminate.

FIG. 2 illustrates in partially exploded form a fuel cell element 70. One component of the fuel cell element 70 is a sintered anode/electrolyte laminate 72. The laminate 72 includes an anode layer 74 and an electrolyte layer 76. The anode layer 74 has the anode gas flow pattern channels 78 therein, on the side remote from the electrolyte layer 76. A simple pattern of parallel channels is shown for illustration, but more complex channel patterns can be readily formed by the described embossing technique.

Returning to the discussion of FIG. 1, a cathode/interconnect laminate is prepared in a similar manner to the steps 20–34 for preparation of the anode/electrolyte laminate, except using constituents specific to the cathode and the interconnect.

The cathode material is preferably lanthanum manganite doped with about 7–8 percent by weight of strontium oxide. A mixture of from about 60 to about 40 parts by volume of doped lanthanum manganite, from about 20 to about 30 parts by volume of the same binder as used for the anode, and from about 20 to about 30 parts by volume of the same plasticizer used for the anode are mixed together in a mixer, numeral 36. The mixture is passed between a pair of rollers to form an unfired cathode tape, numeral 38. In a preferred embodiment, the unfired cathode tape is from about 0.030 inches to about 0.100 inches thick.

The interconnect material is preferably doped lanthanum manganite. A mixture of from about 60 to about 40 parts by volume of doped lanthanum manganite, from about 20 to about 30 parts by volume of the same binder as used for the anode, and from about 20 to about 30 parts by volume of the same plasticizer used for the anode are mixed together in a mixer, numeral 40. The mixture is passed between a pair of rollers to form an unfired interconnect tape, numeral 42. In a preferred embodiment, the unfired interconnect tape is from about 0.005 inches to about 0.020 inches thick, a thickness which can be handled as long as reasonable care is taken.

The thickness of the unfired interconnect tape is preferably $\frac{1}{5}$ or less of the thickness of the cathode tape, as is apparent from the above preferred values. The final thickness of the interconnect is desirably very small in order to reduce internal resistance of the completed fuel cell. When the thickness of the unfired interconnect layer is much less than that of the unfired cathode layer, such as $\frac{1}{5}$ its thickness or less, the subsequently described approach produces a thin (e.g., from about 1 to about 10 micrometer thick) interconnection layer bonded to a somewhat thicker (e.g., from about 0.25 to about 1 millimeter thick) cathode layer.

One layer of the unfired tape comprising a cathode material and one layer of the unfired tape comprising an interconnect material are stacked one over the other. The stack is passed between two rollers to laminate the two layers together to form an unfired cathode/interconnect laminate, numeral 44. The lamination is readily performed due to the presence of the binder and plasticizer in each tape. There is little, if any, reduction in thickness required to accomplish the lamination.

The unfired cathode/interconnect laminate is passed between one or more pairs of rollers to reduce the thickness of the laminate, numeral 46. In order to achieve a very thin interconnect layer in the laminate, an additional cathode tape may be added in contact with the cathode side of the laminate, numeral 47, and the steps 44 and 46 repeated. The steps of adding a further cathode tape 47, laminating 44, and rolling 46 can be repeated multiple times to reach an ever thinner interconnect layer. Desirably, the laminate is rolled in one or more passes or stages until the thickness of the unfired cathode layer is from about 0.25 to about 1 millimeter and the thickness of the unfired interconnect layer is from about 1 to about 10 micrometers. In such thicknesses, the interconnect layer is not self supporting, and can be fabricated and handled only with a substrate support such as the cathode layer.

The cathode layer of the unfired cathode/interconnect laminate is embossed with an cathode gas flow pattern of channels, numeral 48. In operation, the oxygen, air, or other oxidant for the fuel cell is passed through this gas flow pattern of channels. In many conventional fuel cell fabrication approaches, the gas flow pattern must be provided by a pattern of spacers and the like that can add to the weight of the fuel cell. In the present approach, the pattern of channels is formed into the unfired cathode layer using a male die to emboss the pattern. Any operable pattern can be embossed.

The embossed but unfired cathode/interconnect laminate is sintered at elevated temperature, numeral 50. In the preferred approach, the cathode/interconnect laminate is heated to a temperature of from about 200°–500° C. for a period of about 1–5 hours in a furnace to drive off the organic binder and plasticizer. The temperature is thereafter increased to about 1300°–1400° C. for about 1 hour to accomplish sintering of the powder mixture of the cathode and the powder of the interconnect. The sintering also sinters the two tapes firmly together to form a single fired cathode/interconnect laminate.

An advantage of the present approach is that the cathode/interconnect tape can be sintered under different conditions than used for the anode/electrolyte tape. For example, in some cases it may be desirable to sinter the interconnect layer at a temperature as high as about 1600° C.

FIG. 2 shows a cathode/interconnect laminate 80 in its relation to the anode/electrolyte laminate 72. The laminate 80 includes the cathode layer 82 and the interconnect layer 84. The cathode layer 82 has the anode gas flow pattern channels 86 therein, on the side remote from the interconnect layer 84. A simple pattern of parallel channels is shown for illustration, but more complex channel patterns can be readily formed by the described embossing technique.

The sintered laminates 72 and 80 are self-supporting units. Either before or after the sintering steps 34 and 50, the laminates 72 and 80 are cut to desired lateral dimensions. One each of the laminates 72 and 80 are stacked in the manner shown in FIG. 2, with the electrolyte layer 76 facing the embossed channels 86 of the cathode. In the depicted version of FIG. 2, the laminates are stacked such that the channels 78 and 86 are coplanar but at right angles to each other. This arrangement permits the external manifolding (not shown) to the fuel cell element to be located in a convenient manner. The laminates 72 and 80 are bonded together by known techniques such as ceramic bonding tape, ceramic slurry, or metallic brazes, numeral 52. The bonding process may require heating to an elevated temperature to sinter the bonding material in some cases.

The resulting structure is the single fuel cell element 70. The fuel cell element 70 has an electrolyte layer 76 which is only about 1–10 micrometers in thickness, and an interconnect layer 84 that is only about 1–10 micrometers in thickness. The anode layer 74 and the cathode layer 82 are much thicker, but they must be thicker to accommodate the channels 78 and 86 through which the fuel and oxidant flow. The thinness of the layers 76 and 84 substantially reduces the internal resistance of the fuel cell element 70 and its weight per unit power output as compared with conventional fuel cells made with thicker electrolytes and interconnects.

While operable, this fuel cell element 70 produces only a small voltage and current output. To obtain higher voltages and currents, a plurality of the fuel cell elements are stacked in alternating fashion, numeral 54, and bonded together to form a fuel cell, numeral 56.

The sintering, bonding, and stacking steps can be varied in their presence and order to accomplish a more economical fabrication. For example, the stacking and bonding step 52 of two laminates can be omitted, as indicated by line 58. In this case, the sintered laminates from steps 34 and 50 are stacked directly in step 54 and bonded in step 56.

In another variation, the steps 34 and 50 can be omitted. The unfired laminates 72 and 80 are stacked, either in pairs (numeral 52) or in an alternating plurality (numeral 54) and bonded together. In this case, the bonding step 56 is accomplished at a temperature sufficiently high to sinter the laminates 72 and 80.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of preparing a fuel cell element comprising the steps of;

preparing a first unfired ceramic tape comprising an anode material;

preparing a second unfired ceramic tape comprising an electrolyte material, the second ceramic tape being less than about ⅕ the thickness of the first ceramic tape;

laminating the first ceramic tape and the second ceramic tape to form an unfired anode/electrolyte laminate, said electrolyte material forming an electrolyte layer of said unfired anode/electrolyte laminate, and said anode material forming an anode layer of said unfired anode/electrolyte laminate;

rolling the unfired anode/electrolyte laminate to reduce its thickness;

embossing a gas flow path pattern into the anode layer of the unfired anode/electrolyte laminate;

sintering the unfired anode/electrolyte laminate to form a sintered anode/electrolyte laminate;

preparing a third unfired ceramic tape comprising a cathode material;

preparing a fourth unfired ceramic tape comprising an interconnect material, the fourth ceramic tape being less than about ⅕ the thickness of the third ceramic tape;

laminating the fourth ceramic tape and the third ceramic tape to form an unfired cathode/interconnect laminate, said cathode material forming a cathode layer of said unfired cathode/interconnect laminate, and said interconnect material forming an interconnect layer of said cathode/interconnect laminate;

rolling the unfired cathode/interconnect laminate to reduce its thickness;

embossing a gas flow path pattern into the cathode layer of the unfired cathode/interconnect laminate;

sintering the unfired cathode/interconnect laminate to form a sintered cathode/interconnect laminate; and bonding the sintered anode/electrolyte laminate to the sintered cathode/interconnect laminate, such that the electrolyte layer contacts the cathode layer, to form a fuel cell element.

2. The method of claim 1, wherein the step of rolling the unfired anode/electrolyte laminate includes the step of reducing the thickness of the anode/electrolyte laminate so that the thickness of the anode layer is from about 0.25 millimeter to about 1 millimeter and the thickness of the electrolyte layer is from about 1 to about 10 micrometers.

3. The method of claim 1, wherein the step of rolling the unfired anode/electrolyte laminate includes the step of reducing the thickness of the cathode/interconnect laminate so that the thickness of the cathode layer is from about 0.25 millimeter to about 1 millimeter and the thickness of the interconnect layer is from about 1 to about 10 micrometers.

4. The method of claim 1, including the additional step, after the step of bonding stacking and bonding a plurality of the fuel cell elements together.

5. The method of claim 1, including the additional steps, after the step of rolling the unfired anode/electrolyte laminate and before the step of embossing a gas flow path pattern into the anode layer, of laminating at least one additional first unfired ceramic tape to the anode layer of the unfired anode/electrolyte laminate, and rolling the resulting laminate to reduce its thickness.

6. The method of claim 1, including the additional steps, after the step of rolling the unfired cathode/interconnect laminate and before the step of embossing a gas flow pattern into the cathode layer, of laminating at least one additional third unfired ceramic tape to the cathode layer of the unfired cathode/interconnect laminate, and rolling the resulting laminate to reduce its thickness.

* * * * *